US008751649B2

(12) United States Patent
Villait et al.

(10) Patent No.: US 8,751,649 B2
(45) Date of Patent: Jun. 10, 2014

(54) PORT MANAGEMENT SYSTEM

(75) Inventors: Anil Villait, Saratoga, CA (US); Nick G. Suizo, San Jose, CA (US); Govind raj Desur, Cupertino, CA (US); Deepika Dwivedi, San Carlos, CA (US)

(73) Assignee: Extreme Networks, San Jose, CA (US)

(*) Notice: Subject to any disclaimer, the term of this patent is extended or adjusted under 35 U.S.C. 154(b) by 589 days.

(21) Appl. No.: 11/731,135

(22) Filed: Mar. 30, 2007

(65) Prior Publication Data

US 2011/0243133 A9  Oct. 6, 2011

Related U.S. Application Data

(63) Continuation-in-part of application No. 11/147,143, filed on Jun. 7, 2005.

(51) Int. Cl.
| | | |
|---|---|---|
| *G06F 15/173* | (2006.01) | |
| *G06F 15/177* | (2006.01) | |
| *H04L 12/28* | (2006.01) | |
| *H04L 12/50* | (2006.01) | |
| *H04L 12/56* | (2006.01) | |
| *G06F 3/00* | (2006.01) | |
| *G06F 13/00* | (2006.01) | |
| *H04L 12/24* | (2006.01) | |
| *H04L 29/08* | (2006.01) | |
| *G06F 9/30* | (2006.01) | |

(52) U.S. Cl.
CPC .......... *H04L 41/08* (2013.01); *H04L 41/0803* (2013.01); *H04L 41/0806* (2013.01); *H04L 41/0809* (2013.01); *H04L 41/0813* (2013.01); *H04L 41/0816* (2013.01); *H04L 41/0886* (2013.01); *H04L 41/0893* (2013.01); *H04L 41/12* (2013.01); *H04L 41/0681* (2013.01); *H04L 49/351* (2013.01); *H04L 67/2852* (2013.01); *G06F 9/30141* (2013.01); *G06F 2201/86* (2013.01)
USPC .......... 709/225; 709/220; 709/227; 370/254; 370/360; 710/10; 710/104

(58) Field of Classification Search
CPC . H04L 41/08; H04L 41/0803; H04L 41/0806; H04L 41/0809; H04L 41/0813; H04L 41/0816; H04L 41/0886; H04L 41/0893; H04L 41/12; H04L 41/0681; H04L 49/351; H04L 67/2852; G06F 9/30141; G06F 2201/86
USPC .......... 709/225, 220, 227; 370/254, 420, 360; 710/10, 11, 104; 707/1, 3, 10
See application file for complete search history.

(56) References Cited

U.S. PATENT DOCUMENTS 5,561,763 A  * 10/1996 Eto et al. .......................... 714/35
5,751,967 A  *  5/1998 Raab et al. ..................... 709/228

(Continued)

FOREIGN PATENT DOCUMENTS

| WO | WO-0186906 | 11/2001 |
| WO | WO-2006133383 | 12/2006 |

OTHER PUBLICATIONS

Non-Final Office Action for U.S. Appl. No. 11/772,031, Mailed Jul. 6, 2009, 24 pages.

(Continued)

*Primary Examiner* — Viet Vu
*Assistant Examiner* — Herman Belcher
(74) *Attorney, Agent, or Firm* — Blakey, Sokoloff, Taylor & Zafman LLP

(57) ABSTRACT

A method is provided for a port management system in which a switch is automatically provisioned with network resources. A command or set of commands are stored and automatically executed on the switch upon the occurrence of a defined network event. The command or set of commands may be associated with one or more ports on the switch. When executed, the commands cause a change to a port configuration and/or policy on the switch to control access to a network resource. The network resource may include any device or service accessible on the network. The defined network event may include any network event associated with a device or user connected to the network. The command or set of commands may reference variables, control structures, and functions to modify command execution.

36 Claims, 12 Drawing Sheets

(56) References Cited

U.S. PATENT DOCUMENTS

| | | | |
|---|---|---|---|
| 6,070,187 | A | 5/2000 | Subramaniam et al. |
| 6,307,544 | B1 | 10/2001 | Harding |
| 6,456,306 | B1 | 9/2002 | Chin et al. |
| 6,678,248 | B1 | 1/2004 | Haddock et al. |
| 6,816,897 | B2 | 11/2004 | McGuire |
| 6,904,424 | B1* | 6/2005 | Gusler et al. .................. 1/1 |
| 7,380,025 | B1* | 5/2008 | Riggins et al. ............... 710/8 |
| 7,411,915 | B1 | 8/2008 | Spain et al. |
| 8,279,874 | B1 | 10/2012 | Lu et al. |
| 2002/0009078 | A1 | 1/2002 | Wilson et al. |
| 2002/0194407 | A1* | 12/2002 | Kim ......................... 710/104 |
| 2003/0217148 | A1* | 11/2003 | Mullen et al. ............. 709/225 |
| 2003/0225893 | A1 | 12/2003 | Roese et al. |
| 2004/0003600 | A1 | 1/2004 | Hawkins, Jr. et al. |
| 2004/0073600 | A1 | 4/2004 | Elo et al. |
| 2004/0133634 | A1 | 7/2004 | Luke et al. |
| 2005/0163118 | A1 | 7/2005 | Steindl |
| 2005/0195949 | A1* | 9/2005 | Frattura ................... 379/88.17 |
| 2005/0204176 | A1 | 9/2005 | Togawa |
| 2005/0264420 | A1* | 12/2005 | Vogel et al. ............... 340/572.1 |
| 2005/0273851 | A1 | 12/2005 | Raju Datla et al. |
| 2006/0133383 | A1 | 6/2006 | Homer et al. |
| 2006/0168203 | A1 | 7/2006 | Levillain et al. |
| 2006/0187849 | A1 | 8/2006 | Hamedi |
| 2006/0236095 | A1 | 10/2006 | Smith et al. |
| 2006/0274774 | A1* | 12/2006 | Srinivasan et al. ........... 370/420 |
| 2007/0038699 | A1* | 2/2007 | Oikarinen et al. ............ 709/203 |
| 2007/0064624 | A1* | 3/2007 | Finn et al. .................. 370/254 |
| 2008/0101240 | A1* | 5/2008 | Rohilla et al. .............. 370/236 |
| 2008/0147455 | A1 | 6/2008 | Brunswig et al. |
| 2008/0219184 | A1* | 9/2008 | Fowler et al. ............... 370/254 |
| 2011/0243133 | A9 | 10/2011 | Villait et al. |

OTHER PUBLICATIONS

Final Office Action for U.S. Appl. No. 11/772,031, Mailed Dec. 21, 2009, 23 pages.

Non-Final Office Action for U.S. Appl. No. 11/772,031, Mailed May 6, 2010, 33 Pages.

Final Office Action for U.S. Appl. No. 11/772,031, mailed Aug. 31, 2010, 29 pages.

Non-Final Office Action for U.S. Appl. No. 11/772,031, mailed Mar. 8, 2011, 36 pages.

PCT International Preliminary Report on Patentability (Chapter I of the Patent Cooperation Treaty) for International Application No. PCT/US06/22388, mailed Dec. 11, 2007, Whole Document.

Davies, "RADIUS Protocol Security and Best Practices, Microsoft Windows 2000 Server, Microsoft Corporation, Jan. 2002", 8 pages.

Rigney, et al., Remote Authentication Dial in User Service (RADIUS), Network Working Group, Jun. 2000, pp. 1-71.

International Search Report and Written Opinion from the International Searching Authority for International Application No. PCT/US06/22388, mailed Sep. 13, 2007, 12 pages.

Notice of Allowance for U.S. Appl. No. 11/772,031 mailed May 31, 2012, 10 pages.

Advisory Action for U.S. Appl. No. 11/772,031 dated Nov. 10, 2010, 3 pages.

Advisory Action for U.S. Appl. No. 11/772,031 dated Sep. 22, 2011, 2 pages.

Final Office Action for U.S. Appl. No. 11/147,143 dated Feb. 14, 2012, 27 pages.

Advisory Action for U.S. Appl. No. 11/147,143 dated Jul. 9, 2012, 3 pages.

"Final Office Action for U.S. Appl. No. 11/772,031, Mailed Jul. 11, 2011," Whole Document.

"Final Office Action for U.S. Appl. No. 11/147,143, dated Apr. 14, 2011," Whole Document.

"Final Office Action for U.S. Appl. No. 11/147,143, dated Dec. 7, 2009," Whole Document.

"Non-Final Office Action for U.S. Appl. No. 11/772,031," (Feb. 2, 2012), Whole Document.

"Office Action for U.S. Appl. No. 11/147,143, dated Feb. 6, 2009," Whole Document.

"Office Action for U.S. Appl. No. 11/147,143, dated Aug. 17, 2011," Whole Document.

"Office Action for U.S. Appl. No. 11/147,143, dated Aug. 31, 2010," Whole Document.

Non-final Office Action for U.S. Appl. No. 11/147,143 dated May 23, 2013, 32 pages.

Notice of Allowance for U.S. Appl. No. 11/147,143 dated Jan. 2, 2014, 18 pages.

* cited by examiner

PORT MANAGEMENT SYSTEM

CROSS-REFERENCE TO RELATED APPLICATIONS

This application is a continuation-in-part of and claims the benefit of co-pending U.S. patent application Ser. No. 11/147,143 filed on Jun. 7, 2005 entitled METHODS, SYSTEMS, AND COMPUTER PROGRAM PRODUCTS FOR DYNAMIC NETWORK ACCESS DEVICE PORT AND USER DEVICE CONFIGURATION FOR IMPLEMENTING DEVICE-BASED AND USER-BASED POLICIES.

TECHNICAL FIELD

The present invention relates to the field of computer networks and internetworking communications technologies. In particular, the present invention relates to management of ports in a network.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2007, Extreme Networks, Inc., All Rights Reserved.

BACKGROUND

A network switch, such as a bridge (layer 2 switch) or a router (layer 3 switch), is a device that determines the destination of individual data packets (such as Ethernet frames) and selectively forwards them across a local area network (LAN) according to the best route for their destination. The best route is typically associated with one of a number of ports on the switch, which are the switch's external interface to the network. The port is a mission critical part of a network because the port oftentimes is an uplink, collapsing thousands of users in a local area network (LAN) onto a backbone such as the Internet.

The port may also be used to control access to the LAN and LAN resources through the use of port-based network access control protocols. One such protocol is the Institute of Electrical and Electronics Engineers (IEEE) Ethernet-based standard for port-based network access control, IEEE 802.1X. The IEEE 802.1X standard specifies a general method for the provision of port-based network access control. Among other uses, the IEEE 802.1X protocol may be used to authenticate and authorize devices and device users that are connected to a LAN port, where the LAN port is a single point of attachment to the LAN infrastructure, such as a port of a Media Access Control (MAC) Bridge or, in the case of a wireless LAN, an association between an end station and an IEEE 802.11 access point in the wireless LAN.

Once the connected device has been authenticated, the switch must be provisioned with the appropriate network resources based on the type of device and/or identity of the user. Provisioning the switch primarily involves configuring the port to which a device is connected with the proper configuration and policy data for that device and/or device user.

In today's complex converged network environments that support both wired and wireless access to a variety of resources, including voice, video, and data, ensuring that the switch is properly provisioned can be burdensome. For example, in order to provision the switch with the correct network resources, quality of service, and security policy for successful voice operation, the switch port to which a VoIP phone is connected must be configured with the appropriate Link Layer Data Protocol (LLDP) parameters, Virtual Local Area Network (VLAN) name, port VLAN ID, power conservation mode, call server name, 802.1Q framing parameter, and Access Control List (ACL).

Managing the deployment of network configuration and policy data to insure that a switch is properly provisioned has typically been the responsibility of proprietary centralized network management systems (NMS), such as the network management system sold under the trademark "EpiCenter" by Extreme Networks, Inc., of Santa Clara, Calif., the assignee of the present application. The NMS typically operates in conjunction with an authentication server, such as the RADIUS server, to dynamically deploy the proper configuration and policy data to the switch upon successful authentication and authorization of the device and/or user on the network.

One of the challenges presented by relying on the NMS to deploy the proper policy and configuration data to the switch is the delay between the time that the device and/or user is detected/authenticated, and the time that the policy is deployed on the switch. Such a delay can expose the LAN to malicious attack which may result is a denial or degradation of service on the LAN.

SUMMARY

According to one aspect of the invention, a switch in a network is automatically provisioned with network resources using a port management system. The port management system is a flexible framework of components that may be used to implement a method for automatically provisioning a switch with a network resource based on the occurrence of a defined network event. The network resource may include any device or service accessible on the network. The defined network event may include any network event associated with a device or user connected to the network.

According to one aspect of the invention, the method for automatically provisioning a switch with network resources based on the occurrence of a defined network event includes executing a profile associated with the defined network event when the event occurs. A profile contains one or more commands, the execution of which cause a dynamic port configuration change. The dynamic port configuration change enforces a particular policy on the affected port or ports.

According to one aspect of the invention, the port management system provides for the creation, editing and storing of profiles on the switch using the switch's command line interface (CLI). Alternatively, the port management system provides for the creation, editing and storing of profiles using a network management system (NMS) for later deployment to the switch. Once created, profiles may be associated with a particular port or port list and configured to execute upon the occurrence of one or more defined network events.

According to one aspect of the invention, the defined network events may include user events, such as NetLogin events occurring when a user is authenticated or unauthenticated, or device events, such as Link Layer Data Protocol (LLDP) events occurring when a device is detected or undetected. Profiles may also be configured to execute upon the occurrence of timer events, i.e., to execute at a specified time, or after a specified interval has occurred.

According to one aspect of the invention, profiles may be static or dynamic. Static profiles are typically not event-driven, but rather manually executed on the switch, using the CLI, in order to implement a set of commands that parameterize and simplify complex configuration tasks, such as Netlogin, or to test a profile that is otherwise considered a dynamic profile. For the purpose of managing the dynamic configuration and policy changes as described in the present application, however, most profiles are dynamic in that they are event-driven, meaning that they are automatically executed upon the occurrence of a defined network event associated with the profile, such as a user logon, or a device detection.

According to one aspect of the invention, profiles may be executed in persistent or non-persistent mode. Static profiles are generally executed in persistent mode, i.e., the configuration and policy changes implemented by static profiles are saved in the switch configuration and preserved when the switch is rebooted. Dynamic profiles are generally executed in non-persistent mode, meaning that the changes to the affected ports are not saved in the switch configuration, and therefore not preserved when the switch is rebooted. Regardless of whether a change is persistent or non-persistent, however, changes implemented by both static and dynamic profiles may be synchronized to the redundant switch backup in the case of a failover.

According to one aspect of the invention, the commands contained in the profile may contain references to variables, the values of which may be made available to the profile at the time the profile is executed on the switch. The values may include the values of arguments made available to the network when a defined network event occurs, such as the security profile variables that are made available to the network by an authentication server when a user has been authenticated on a device connected to the network. Alternatively, the values of certain variables may be determined at the time of execution by reference to values previously stored in the switch, including the values of common variables that are available to all profiles, as well as the values of session variables that are available to a particular profile to, for example, save the current state of the profile to facilitate testing and/or to facilitate restoring the affected port's configuration and policy when a user logs off or a device times out.

According to one aspect of the invention, profiles may contain control structures to conditionally modify command execution during the execution of the profile. For example, the control structures may include, among others, conditional execution and recursive logic that can be used in conjunction with variable expression evaluation operators to conditionally modify the execution of the commands in the profile. The profiles may also contain references to certain built-in functions to perform common tasks.

According to one aspect of the invention, the port management system may support execution of profiles in different error-handling modes, including the ability to ignore errors or abort execution. The port management system may further support access to a particular profile's execution history, such as in the form of a profile execution log that may be stored on the switch for later inspection via the CLI or other facility.

In addition to the aspects and advantages of the present invention described in this summary, further aspects and advantages of the invention will become apparent to one skilled in the art to which the invention pertains from a review of the detailed description that follows, including aspects and advantages of an apparatus to carry out the above-described port management system and methods.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description various aspects of the present invention, a method and apparatus for a port management system, will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known architectures, steps, and techniques have not been shown to avoid unnecessarily obscuring the present invention. For example, specific details are not provided as to whether the method, system and apparatus is implemented in a router, bridge, server or gateway, or as a software routine, hardware circuit, firmware, or a combination thereof.

Parts of the description will be presented using terminology commonly employed by those skilled in the art to convey the substance of their work to others skilled in the art, including terms of operations performed by a computer system, switch, or other network device, and their operands. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, reference throughout this specification to "one embodiment," "an embodiment," or "an aspect," means that the particular feature, structure, or characteristic that is described is included in at least one embodiment of the invention, but not necessarily in the same embodiment. Furthermore, the particular features, structures, or characteristics may be combined in any suitable manner in one or more embodiments.

Figure 1:
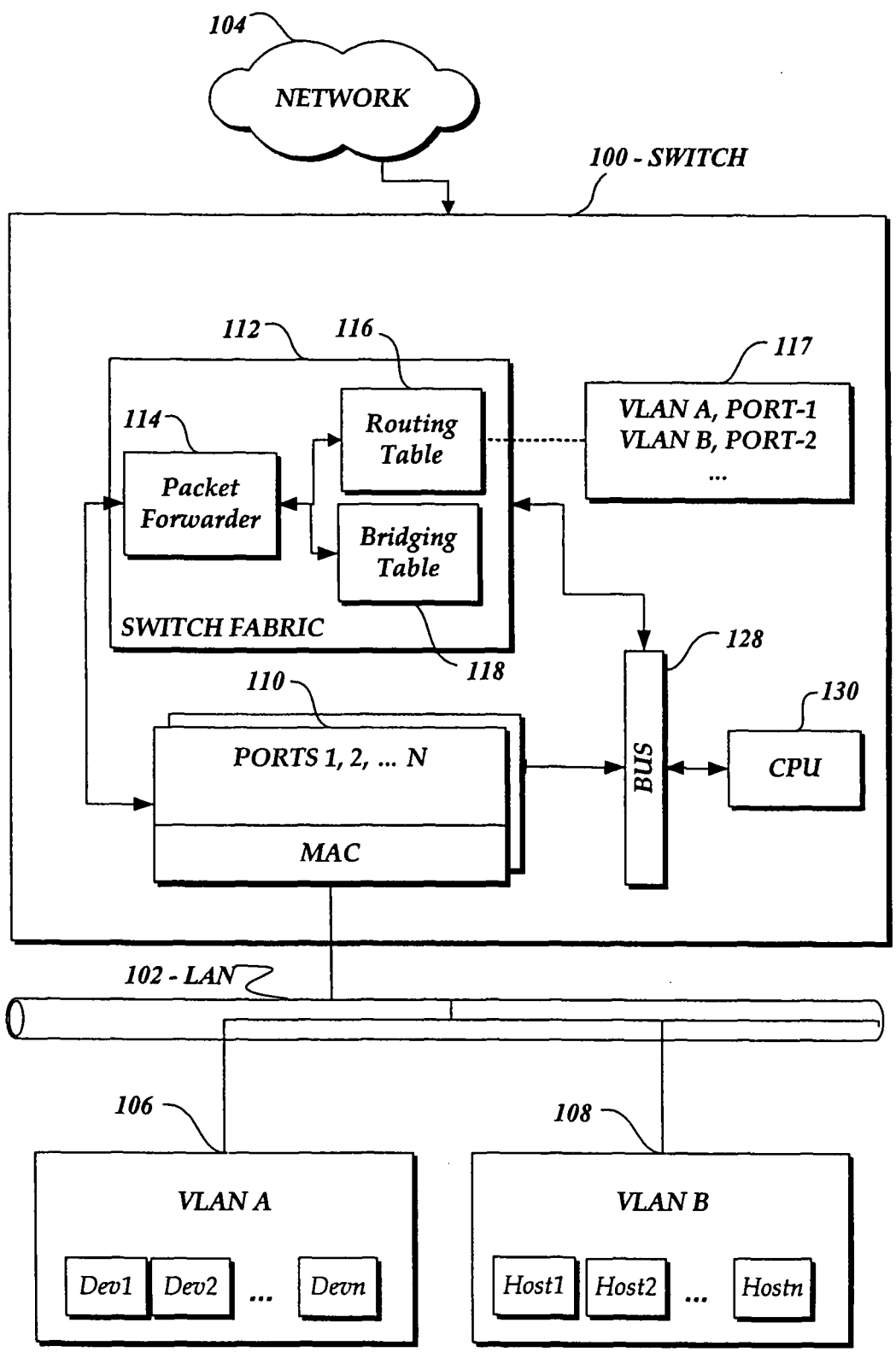
FIG. 1 is a block diagram illustrating certain aspects of a switch in a Local Area Network (LAN), an example of an operating environment in which the invention may be practiced.

FIG. 1 is a block diagram illustrating certain aspects of a switch in a Local Area Network (LAN), and serves as an example of an operating environment in which the invention may be practiced. A network device 100, such as a switch, connects a local area network LAN 102 serving virtual LANs VLANA 106 and VLANB 108 to inter-network 104. The switch 100 comprises several ports, including the illustrated ports 110 numbered "1," "2," and so forth, each having a Media Access Control MAC chip 111 or similar component to connect the port 110 to LAN 102. The switch 100 further comprises a switch fabric 112 that typically includes, among other components, a bus 128, a central processing unit (CPU) 130, a packet forwarder 114, a routing table 116, a bridging table 118, and a port description table 117 for carrying out packet-forwarding operations on behalf of the devices and hosts connected to the LAN and VLANs.

Figure 2:
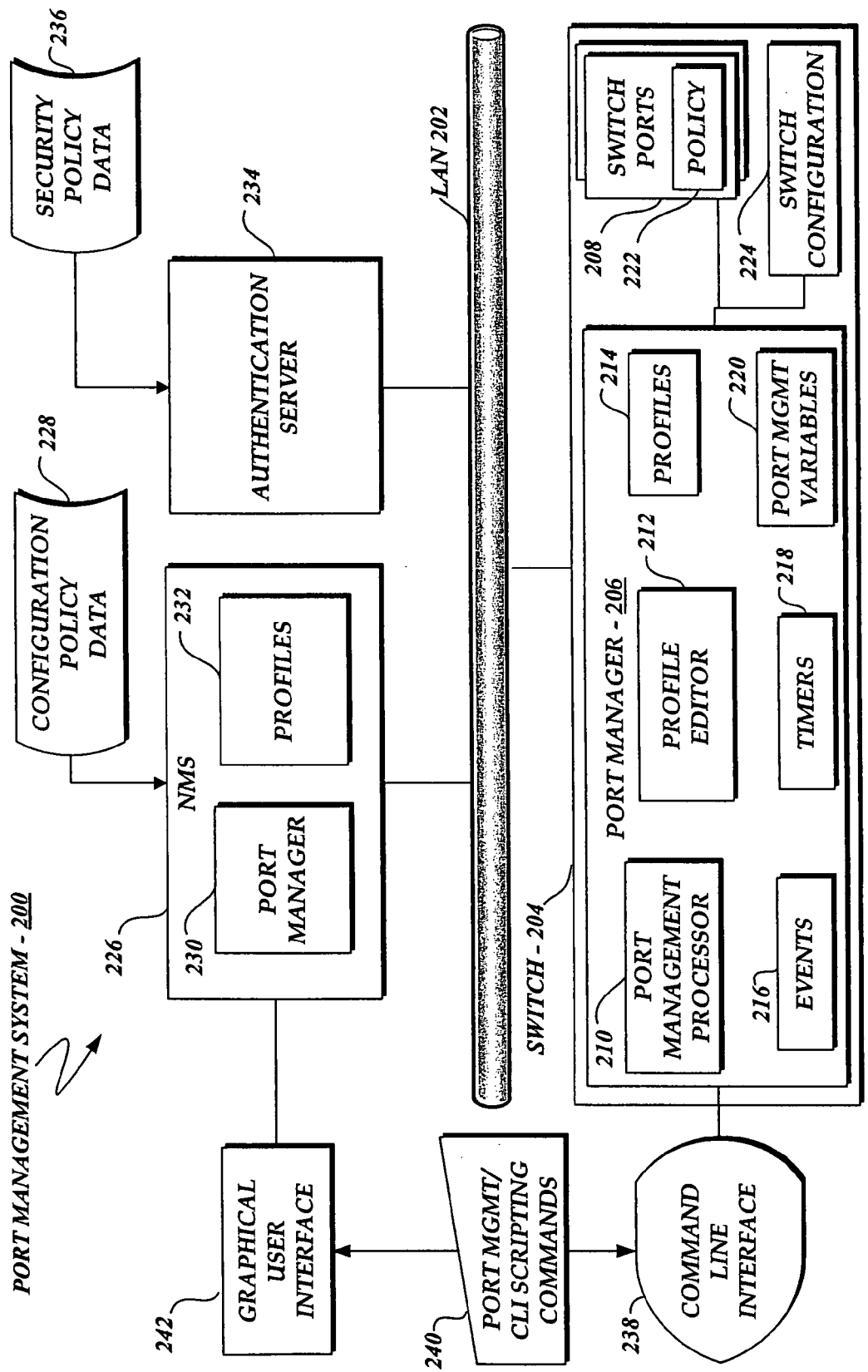
FIG. 2 is a block diagram illustrating certain aspects of a port management system, including a switch incorporating a port manager and other components for automatically provisioning the switch with network resources in accordance with an embodiment of the invention.

FIG. 2 is a block diagram illustrating certain aspects of a port management system 200, including a switch 204 incorporating various components for automatically provisioning the switch with network resources in accordance with an embodiment of the invention. In a typical embodiment, the port management system 200 complements a port-based network access control system implemented on the LAN 202, such as port-based network access control implemented using the IEEE 802.1X standard. The port management system 200 may operate in conjunction with a network management system (NMS) 226 having access to configuration policy data 228 for the LAN and/or an authentication server 234 having access to a security policy data 236 for the LAN.

In the illustrated embodiment of the port management system 200, the switch 204 is provided with a port manager 206 having components that are typically accessed via a command line interface (CLI) 238 to the switch. Alternatively, or in addition, the NMS 226 is provided with a port manager 230 that is similar to the switch port manager 206, but having components that are typically accessed via a graphical user interface (GUI) 242 instead of a CLI 238. In a typical embodiment, the NMS port manager 230 is similar to the switch port manager 206, but generally supports only a subset of the features that are supported by the switch port manager 206. Accordingly, references to a port manager in the description that follows refers primarily to capabilities provided in the switch port manager 206, but can also refer to capabilities that are provided in the NMS port manager 230. Both the CLI 238 and GUI 242 are capable of receiving and dispatching port management commands 240 entered by a user to exploit the capabilities of the port management system 200 using the port managers 206/230.

In one embodiment, the port manager 206 includes, among other components, a profile editor 212 that supports the creation, editing, and viewing of profiles 214, typically through the use of various port management commands 224. A profile 214 is a set of commands that are applied to a switch 204, i.e., executed on a switch, to configure the switch, such as to change a port configuration, or to update a policy that is enforced on the port.

In a typical embodiment, a profile may be configured to execute in response to a user event, such as a user authentication by an authentication server. A profile may also be configured to execute in response to a device event, such as the detection of a device. As such, most profiles are dynamic, since they are dynamically applied to the switch in response to the occurrence of an event 216, or upon the expiration of a timer 218. In some cases, however, a profile may instead be static, meaning that it is applied to the switch, not in response to an event 216 or timer 218, but rather on demand to parameterize and simplify an otherwise complex configuration task. In such cases, the profile is typically executed on demand by entering a port management command 240 using the switch's CLI 238, or remotely from the NMS 226, using the GUI 242.

In a typical embodiment, profiles 214 are generally stored on the switch 204 for later execution on a processor in the switch, referred to here as a port management processor 210. In one embodiment, profiles 232 may be created, edited, stored and viewed on the NMS 226 and later deployed to the switch 204 and stored with profiles 214 for later execution on the port management processor 210. In some cases, profiles 214 stored on the switch 204 may be viewed and edited via the NMS port manager 230. In one embodiment, the profile editor 212 may be implemented as part of a scripting component that may already be provided on the switch 204, while in other embodiments the profile editor 212 may be implemented as a separate component. The types and uses of profiles 214 will be described in further detail below.

In one embodiment, the port manager 206 includes a repository to store not only the profiles 214, but also to store the port management network events 216 and/or timers 218 to which the profiles may be configured to respond. Events 216 and timers 218 are typically defined on the switch 204 through the use of port management commands 224, but may also be defined elsewhere and deployed to the switch using other means. As noted earlier, defined network events 216, such as the detection of a device or the authentication of a user connected to the LAN 202, can trigger the execution of one or more profiles. The timers 218 also describe events that can trigger the execution of one or more profiles, specifically the time at which, or interval after which, a profile is executed. The types and uses of events 216 and timers 218 will be described in further detail below.

In one embodiment, the port manager 206 further includes a repository in which to store the values of certain variables, referred to here as port management variables 220, where such values may be accessed by the profiles 214 at the time of execution. The values of the port management variables 220 are typically automatically provided by the originator of the event upon the event's occurrence in the form of arguments or parameters communicated to the switch 204 via the LAN 202, such as in a vendor specific attribute (VSA) string provided by an authentication server upon authentication of a user. In some cases, the values of the port management variables 220 may also be manually set by a user, such as for testing purposes, through the use of the various port management commands 240 or through other means, or may be saved from a prior execution of a profile or other command on the switch 204. The types and uses of port management variables 224 will be described in further detail below.

During operation of the port management system 200, upon execution of a profile 214 on the switch 204, the port management processor 210 dynamically configures the affected switch ports 208 and updates their respective policies 222 as specified in the profile. As noted earlier, profiles 214 may be static or dynamic. Profiles may also be executed in persistent or non-persistent mode. Static profiles are generally executed in persistent mode, i.e., the configuration and policy changes implemented by static profiles are saved in the switch configuration 224 and preserved when the switch 204 is rebooted. Dynamic profiles 214, however, are generally executed in non-persistent mode, meaning that the changes to the affected switch ports 208 and policy 222 are not saved in the switch configuration, and therefore not preserved when the switch is rebooted. It is contemplated that most of the commands in the profiles used to make dynamic port configuration and policy changes using the port management system 200 will be executed in non-persistent mode, meaning that such changes will not be permanently saved in the switch configuration 114. In a typical embodiment, however, any dynamic port configuration and policy changes implemented through the execution of a profile 214 may be synchronized to the redundant switch backup (not shown) in the case of a failover, even though they may not have been saved in the switch configuration 114.

Figure 3:
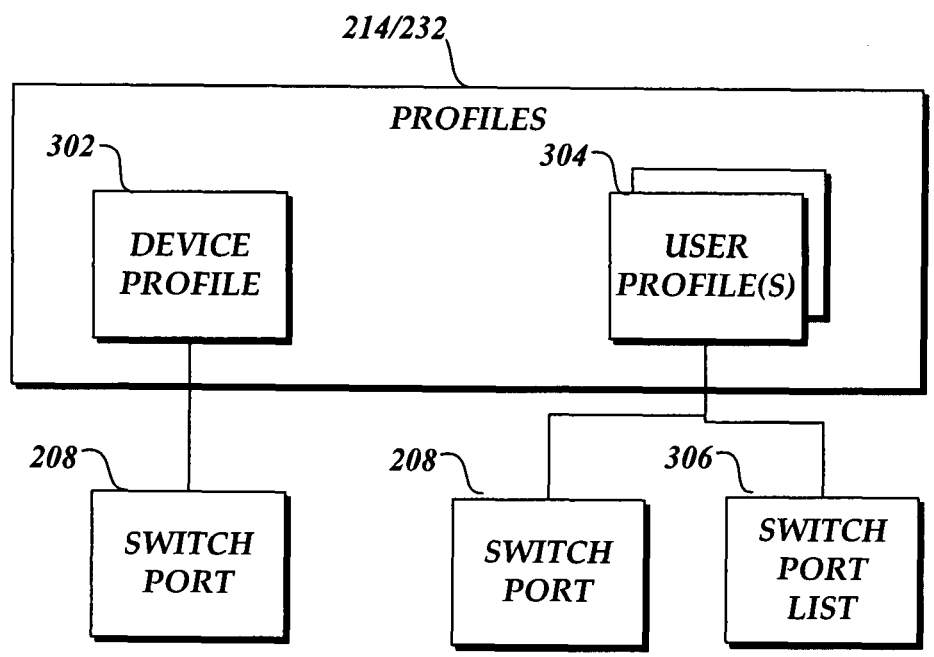
FIG. 3 is a block diagram illustrating certain aspects of profiles for automatically provisioning the switch with network resources in accordance with an embodiment of the invention.

FIG. 3 is a block diagram illustrating certain aspects of profiles 214/232 for automatically provisioning the switch 204 with network resources in accordance with an embodiment of the invention. As shown, profiles 214/232 may be categorized as device profiles 302, so named because they are typically executed in response to an event 216 associated with a device, such as the detection or un-detection of a device connecting to the LAN 202. Device profiles 302 may also be executed in response to a timer 218. A device profile 302 is typically associated with a particular switch port 208. Numerous parameters of the particular switch port 208 may be configured by the commands contained in the device profile 302, such as Link Layer Data Protocol (LLDP) parameters, the values of which are made available at the time the profile is executed, including the VLAN name, port VLAN ID, power conservation mode, file server name, call server name, 802.1Q framing parameters, and Access Control List (ACL).

Profiles 214/232 may also be categorized as user profiles 304, also referred to as security profiles, so named because they are typically executed in response to an event 216 associated with a user, such as the authentication or un-authentication of a user signing on to the LAN 202 using, for example, a MAC-based, 802.1X-based, or web-based NetLogin process. Like device profiles 302, a user profile 304 may also be executed in response to a timer 218. Unlike device profiles 302, however, a user profile 304 may be associated with more than one switch port 208 using a switch port list 306. Unlike device profiles 302, multiple user profiles 304 may be associated with a particular switch port, such as one profile for logon events, and another profile for logoff events. Alternatively, the same user profile 304 may be applied at logon or logoff, but the commands contained in the user profile 304 may be configured to take different actions based on which event triggered execution. Numerous parameters of a switch port 208 may be configured by the commands contained in user profiles 304, such as the security parameters provided through an authentication server, such as a RADIUS server. In a typical embodiment, the RADIUS server will use a vendor-specific attribute (VSA) string in which to specify the name of the user profile 304 and a list of parameters and values that are associated with that user profile, such as the quality of service profile name, an ACL, and the name of alternate user profile to execute when the user logs off the LAN. The list of parameters and values in the VSA are made available to the switch at the time the user profile 304 is executed.

Figure 4:
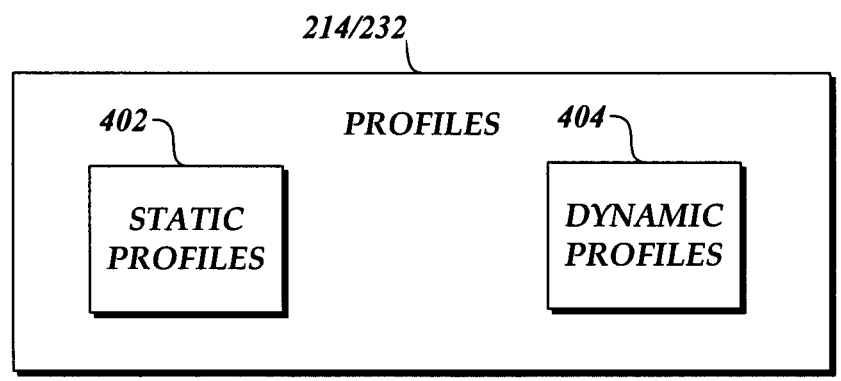
FIG. 4 is a block diagram illustrating certain other aspects of profiles for automatically provisioning the switch with network resources in accordance with an embodiment of the invention.

FIG. 4 is a block diagram illustrating certain other aspects of profiles 214/232 for automatically provisioning the switch with network resources in accordance with an embodiment of the invention. As shown, profiles 214/232 may be further categorized as static profiles 402 or dynamic profiles 404. As earlier described, a dynamic profile 404 is dynamically applied to the switch in response to the occurrence of an event 216, or upon the expiration of a timer 218. In contrast, a static profile 402 is applied to the switch, not in response to an event 216 or timer 218, but rather on demand to parameterize and simplify an otherwise complex configuration task. As such, a static profile 402 may be executed on demand by entering a port management command 240 directly on the switch using the switch's CLI 238, or remotely from the NMS 226, using the GUI 242.

Figure 5:
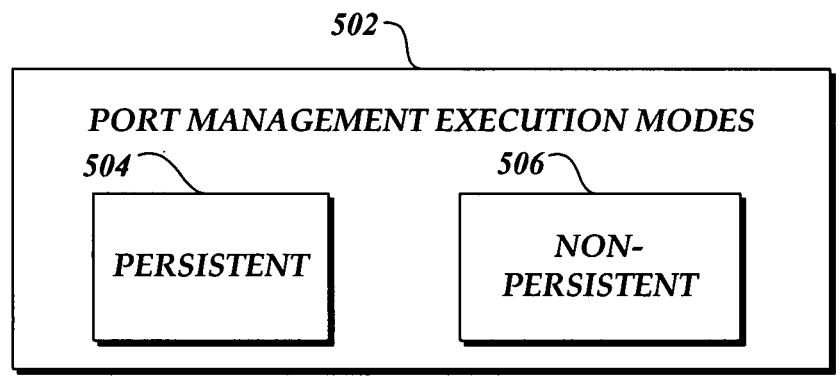
FIG. 5 is a block diagram illustrating certain aspects of port management execution modes for automatically provisioning the switch with network resources in accordance with an embodiment of the invention.

FIG. 5 is a block diagram illustrating certain aspects of port management execution modes 502 for automatically provisioning the switch with network resources in accordance with an embodiment of the invention. As shown, there are two types of port management execution modes 502, persistent mode 504, and non-persistent mode 506. As noted earlier, dynamic profiles 404 are generally executed in non-persistent mode 506, meaning that the changes to the affected switch ports 208 and policy 222 are not saved in the switch configuration, and therefore not preserved when the switch 204 is rebooted. Static profiles 402 are generally executed in persistent mode 504, meaning that the configuration and policy changes implemented by static profiles are saved in the switch configuration 224 and preserved when the switch 204 is rebooted.

Figure 6:
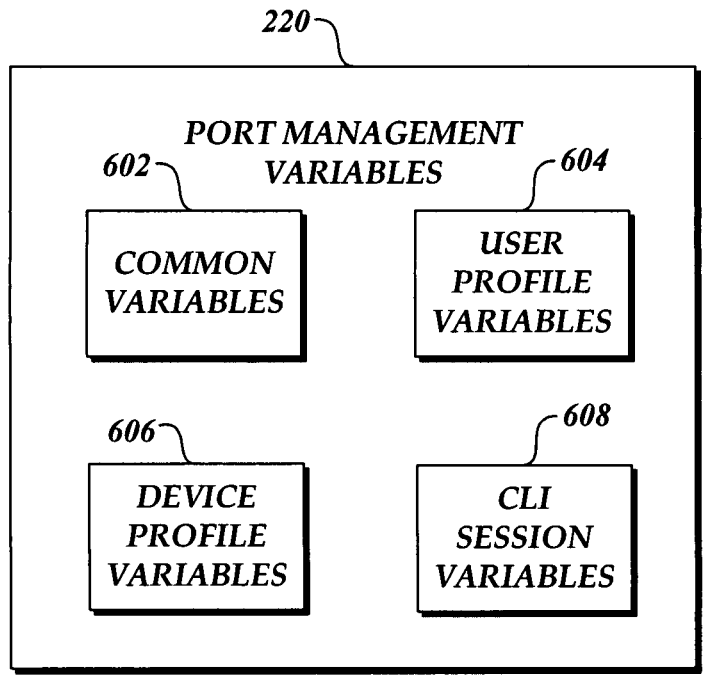
FIG. 6 is a block diagram illustrating certain aspects of port management variables for automatically provisioning the switch with network resources in accordance with an embodiment of the invention.

FIG. 6 is a block diagram illustrating certain aspects of port management variables 220 for automatically provisioning the switch 204 with network resources in accordance with an embodiment of the invention. Port management variables 220, the values of which may be stored on the switch 204 and/or made available to the switch 204 at the time a profile is executed, may be categorized as common variables 602, user profile variables 604, device profile variables 606, and CLI session variables 608.

A common variable 602 is a variable that is generally available for use in any profile 214/232, the values being set prior to execution of the profile. Common variables 602 may be used to store values for numerous data, including but not limited to, the status of the last command execution, the name of the user in the current session of the CLI, a CLI session type, the name of the current profile, as well as the name of the event that triggered execution of the current profile, the time that the event occurred, and, if applicable, the name and type of timer that triggered the execution of the current profile and the timer's delta value, i.e., the difference between the time the timer expired and the time the profile began execution.

A user profile variable 604 is a variable that is generally available for use only in user profiles 304. User profile variables 604 may be used to store values for numerous data, including but not limited to, the name of the user that was authenticated, provided, for example, in the MAC address string for MAC-based NetLogin events, the number of authenticated users on the affected switch port after the occurrence of the current event, the MAC and/or IP address of the user, as well as the port and VLAN associated with the current event.

A device profile variable 606 is a variable that is generally available for use only in device profiles 302. Device profile variables 606 may be used to store values for numerous data, including but not limited to, the device identification, which is typically contained in the values reported in the LLDP parameters referenced earlier, the IP and MAC address of the device, as well as the power, manufacturer, and model name of the device.

Lastly, a session variable 608 is a variable that is generally available for use only by a particular execution of a profile 214/232 on the switch 204, and are used in conjunction with certain port management commands 240 used for variable management, such as commands to load, save, and delete the session variables. The values of the session variables may be saved using a unique key generated during the current profile execution, and may be later retrieved and restored in a subsequent session using the same unique key. Session variables may be used in this manner to, for example, save the current profile state in order to restore the profile when a user logs off, or a device times out.

Figure 7:
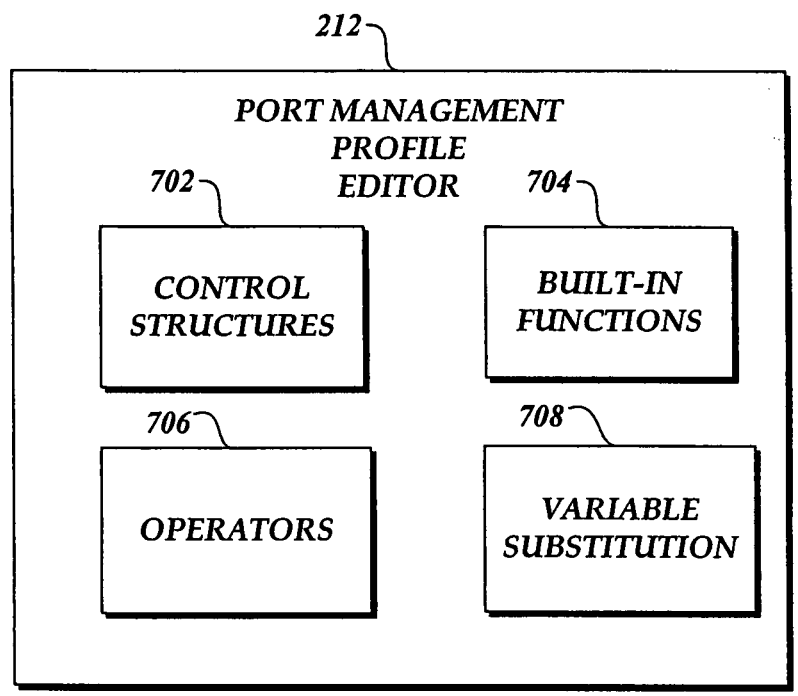
FIG. 7 is a block diagram illustrating certain aspects of a port management profile editor for automatically provisioning the switch with network resources in accordance with an embodiment of the invention.

FIG. 7 is a block diagram illustrating certain aspects of a port management profile editor for automatically provisioning the switch with network resources in accordance with an embodiment of the invention. In a typical embodiment, a profile editor 212 may be used to create, edit, view and store profiles 214/232 in a switch 204 and/or an NMS 226. The profile editor 212 enables a user to compose commands in a profile 214/232 that contain, among other things, control structures 702, built-in functions 704, operators 706, and variables 708. The control structures 702 allow a user to craft commands that execute conditionally or recursively based on the evaluation of expressions containing references to the various port management variables 220 described with reference to FIG. 6. The control structures 702 include, for example, "IF (<expression>) THEN <statements>ELSE <statements>ENDIF" structures and WHILE (<expression>) DO<statements>ENDWHILE structures. In some cases, the structures may be nested for additional control over command execution. The expressions used in the structures may be composed of operators 706 and references to variables 708, which may be references to port management variables 220, the values of which are made available at the time of execution. The operators 706 may include, but are not limited to, various string and integer operands, as well as Boolean and other logic operands. The expressions used in the structures may also be composed of built-in functions 704 that are invoked at the time of execution, and are used to simplify common tasks in a profile, including but not limited to, string manipulation, such as matching two strings or changing a string to uppercase format.

Figure 8:
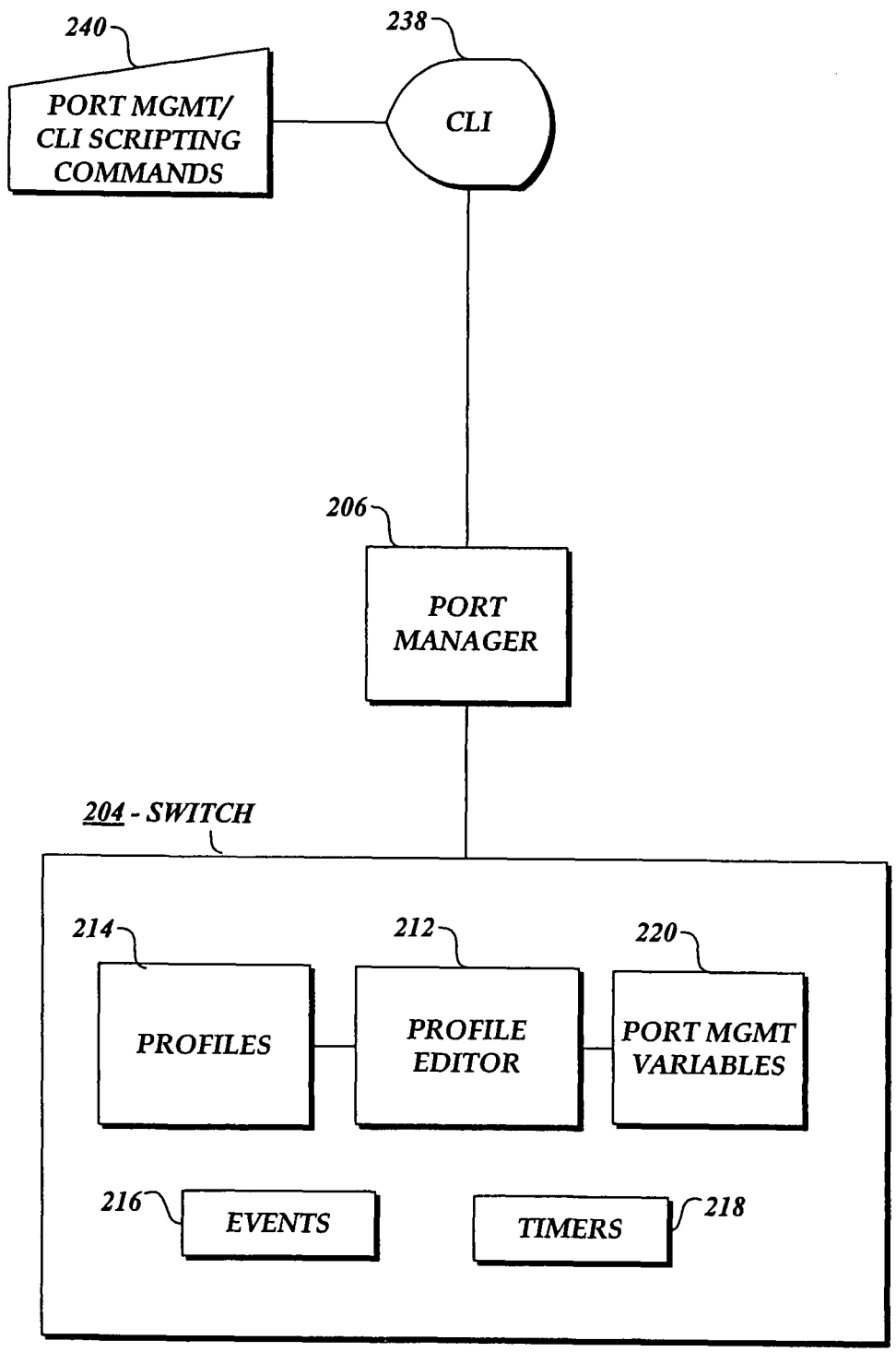
FIG. 8 is a block diagram illustrating certain aspects of the operation of a port management system for automatically provisioning the switch with network resources in accordance with an embodiment of the invention.

FIG. 8 is a block diagram illustrating certain aspects of the operation of a port management system 200 for automatically provisioning the switch 204 with network resources in accordance with an embodiment of the invention. In the illustrated embodiment, during operation of the port management system 200, a user may enter a port management command 240 via a CLI 238 to a switch 204 to invoke the functions of a port manager 206, including but not limited to, using the profile editor 212 to create, edit, view and store profiles 214, to define events 216 and timers 218, to execute profiles 214 on demand, and to create and manipulate port management variables 220.

Figure 9:
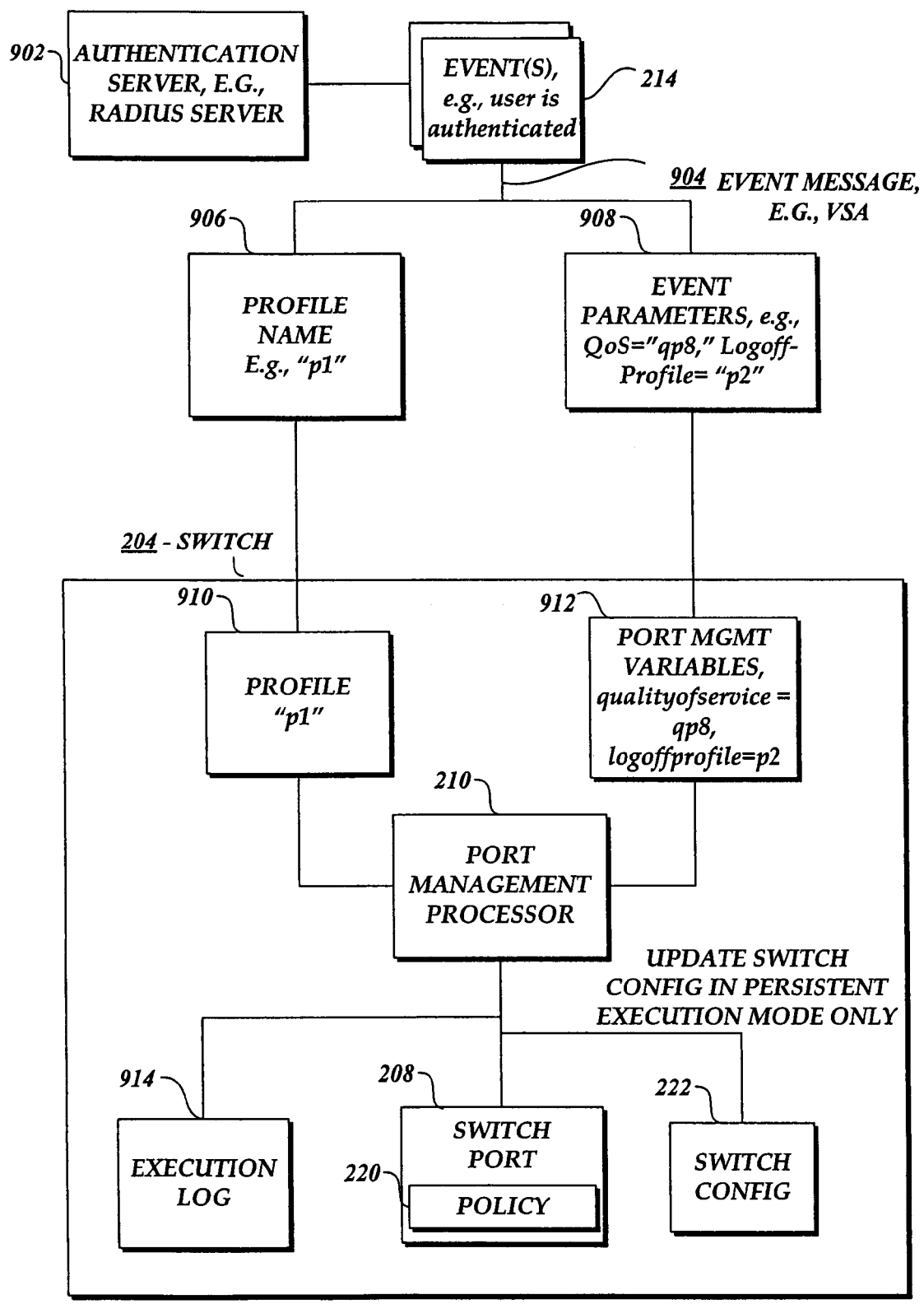
FIG. 9 is a block diagram illustrating certain other aspects of the operation of a port management system for automatically provisioning the switch with network resources in accordance with an embodiment of the invention.

FIG. 9 is a block diagram illustrating certain other aspects of the operation of a port management system 200 for automatically provisioning the switch 204 with network resources in accordance with an embodiment of the invention. In the illustrated embodiment, during operation of the port management system 200, an event 214 may occur as a result of an authentication performed by an authentication server 902, such as a RADIUS server. The RADIUS server 902 may provide an event message 904 in the form of a vendor specific attribute (VSA) string that specifies the profile name 906 to be triggered in response to the user authentication event 214, as well as various event parameters 908, such as the quality of service profile specified for the user and the logoff profile. At the switch 204, the port management processor 210 processes the specified profile, in this case profile "p1," after substituting the event parameters 908 for the corresponding port management variables 912, in this case quality of service profile "qp8" and logoffprofile "p2." Upon execution of profile "p1" the port management processor 210 configures the switch port 208 associated with the profile "p1" and updates the policy 220 to be enforced on the switch port 208, in accordance with the instructions provided by the commands contained in profile "p1." In some cases, should the port management processor 210 be instructed to execute in persistent mode, then the port management processor 210 will update the switch configuration 222 with the configuration and policy changes made to the switch port 208 and policy 220. In one embodiment, the port management processor 210 may also generate and execution log 914 in which to store a log of commands executed in the profile "p1" 910 for subsequent use and debugging.

Figure 10:
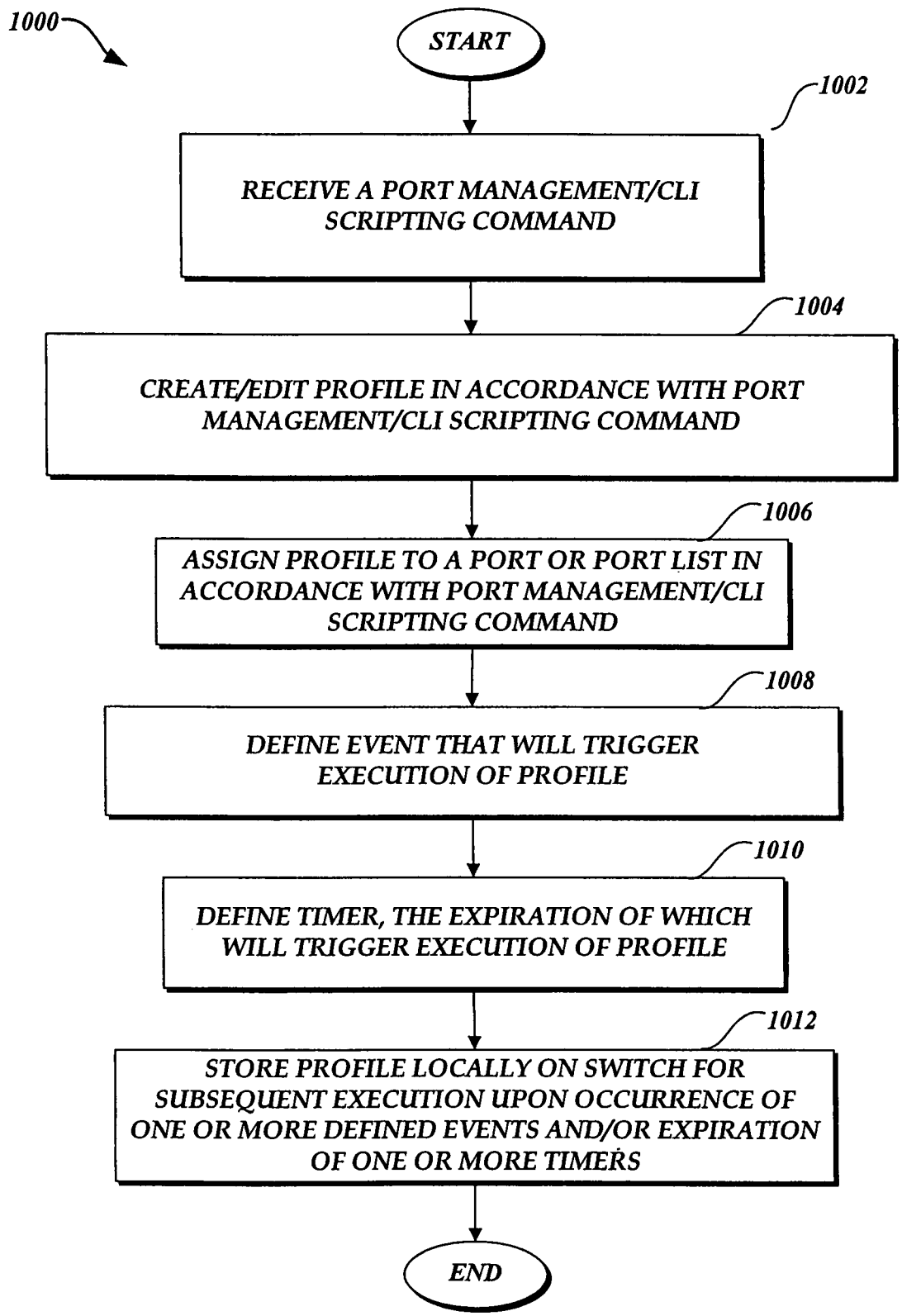
FIG. 10 is a flow diagram illustrating certain aspects of a method to be performed in a port management system for automatically provisioning the switch with network resources in accordance with an embodiment of the invention.

FIG. 10 is a flow diagram illustrating certain aspects of a method 1000 to be performed in a port management system 200 for automatically provisioning the switch with network resources in accordance with an embodiment of the invention. In one embodiment, at block 1002, a port management system 200 receives a port management command 240 via an interface, such as a CLI 238 or a GUI 242. At block 1004, the port management system 200 may create/edit/view a profile 214/232 in accordance with the port management command. At block 1006, the port management system 200 may assign a profile to a port 208 or port list 306 in accordance with the port management command. At block 1008, the port management system 200 may define an event 216 to trigger an execution of a profile in accordance with the port management command. Similarly, at block 1010, the port management system 200 may define a timer, the expiration of which may trigger an execution of a profile in accordance with the port management command. At block 1012 the port management system 200 may store a profile locally on a switch for subsequent execution upon occurrence of one or more defined events and/or expiration of one or more timers.

Figure 11:
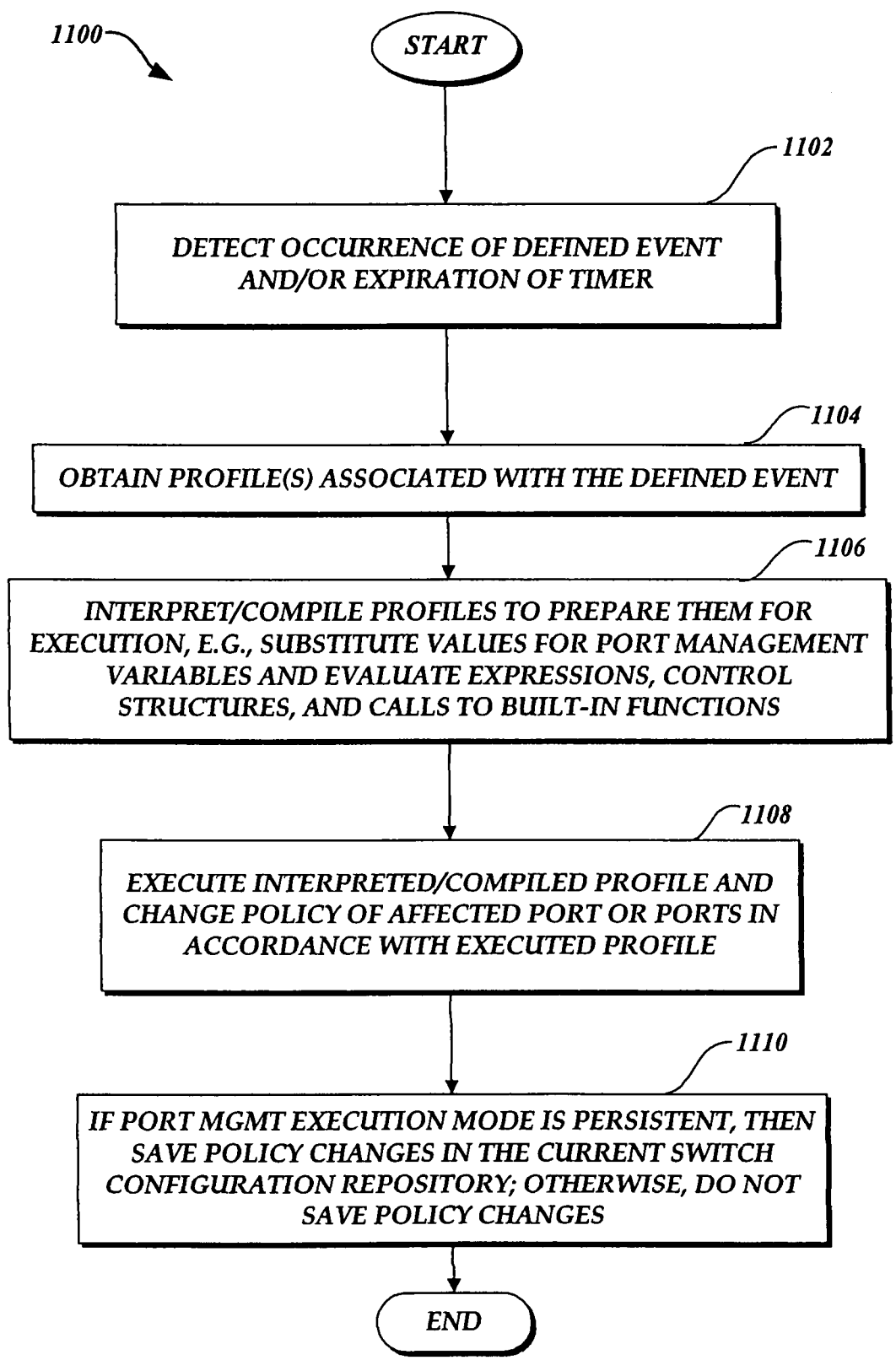
FIG. 11 is a flow diagram illustrating certain other aspects of a method to be performed in a port management system for automatically provisioning the switch with network resources in accordance with an embodiment of the invention.

FIG. 11 is a flow diagram illustrating certain other aspects of a method 1100 to be performed in a port management system 200 for automatically provisioning the switch 204 with network resources in accordance with an embodiment of the invention. In one embodiment, at block 1102, a port management system 200 detects the occurrence of a defined event and/or the expiration of a timer. At block 1104, the port management system 200 obtains a profile or profiles that have been configured to respond to the event. At block 1106, the port management system 200 uses the facilities of a port management processor 210 to interpret and/or compile the obtained profile(s) to prepare them for execution, including but not limited to, substituting the values of the port management variables reference in the profiles with the current event's parameters, evaluating expressions present in the profile's control structures, and invoking the referenced built-in functions. At block 1108, the port management processor 210 executes the interpreted/compiled profile(s) and proceeds to change the configuration and policy of the affected port or ports in accordance with the instructions in the commands of the executed profile. In one embodiment, at block 1110, if the port management execution mode is persistent, then the port management processor 210 saves the configuration and policy changes in the current switch configuration repository for preservation in case the switch is rebooted.

Figure 12:
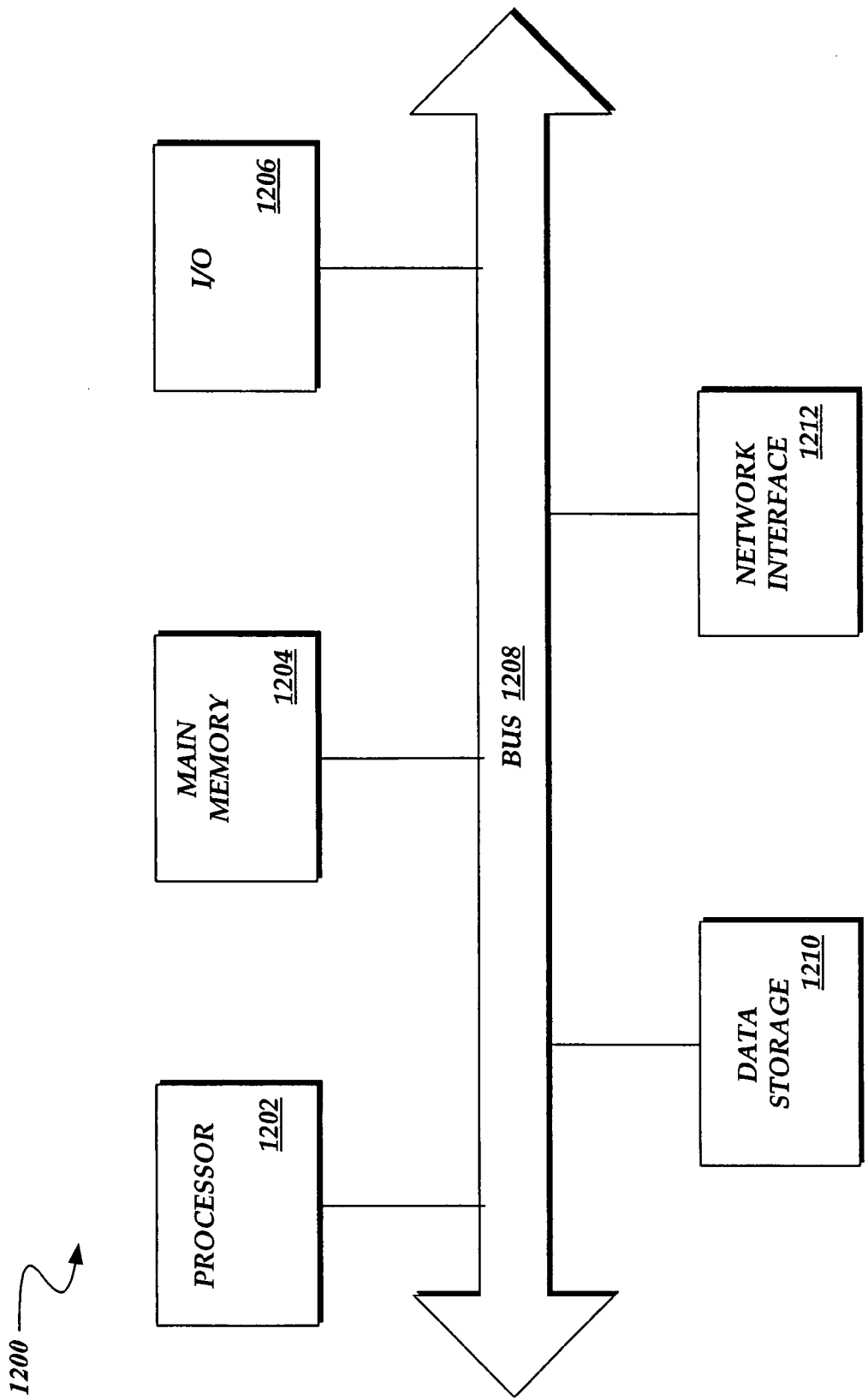
FIG. 12 illustrates one embodiment of a suitable computing environment in which certain aspects of the invention illustrated in FIGS. 1-11 may be practiced.

FIG. 12 illustrates one embodiment of a suitable computing environment in which certain aspects of the invention illustrated in FIGS. 1-11 may be practiced. In one embodiment, the port management system 200, and methods and apparatus for automatically provisioning the switch 204 with network resources in accordance with an embodiment of the invention may be implemented on a computer system 1200 having components 1202-1212, including a processor 1202, a memory 1204, an Input/Output device 1206 a data storage 1210, and a network interface 1212, coupled to each other via a bus 1208. The components perform their conventional functions known in the art and provide the means for implementing the port management system 200. Collectively, these components represent a broad category of hardware systems, including but not limited to general purpose computer systems, servers, switches and other specialized packet-forwarding devices.

In one embodiment, the memory component 1204 may include one or more of random access memory (RAM), and nonvolatile storage devices (e.g., magnetic or optical disks) on which are stored instructions and data for use by processor 1202, including the instructions and data that comprise the port management system 200 components, including the profile editor 212, port management processor 210, profiles 214, events 216, timers 218, and port management variables 220. The data storage component 1210 may also represent the instructions and data that comprise the port management system 200 components, including the profile editor 212, port management processor 210, profiles 214, events 216, timers 218, and port management variables 220. In one embodiment, the network interface component 1012 may include the switch ports 208.

It is to be appreciated that various components of computer system 1200 may be rearranged, and that certain implementations of the present invention may not require nor include all of the above components. Furthermore, additional components may be included in system 1200, such as additional processors (e.g., a digital signal processor), storage devices, memories, network/communication interfaces, etc.

In the illustrated embodiment of FIG. 12, the method and apparatus for a port management system 200 in accordance with one embodiment of the invention as discussed above may be implemented as a series of software routines executed by computer system 1200. The software routines may comprise a plurality or series of instructions, code sequences, configuration information, or other data to be accessed and/or executed by a processing system such as one or more of processor 1202. Initially, the series of instructions, code sequences, configuration information, or other data may be stored on a data storage 1210 and transferred to memory 1204 via bus 1208. It is to be appreciated that the series of instructions, code sequences, configuration information, or other data can be stored a data storage 1210 using any conventional computer-readable or machine-accessible storage medium, such as a diskette, CD-ROM, magnetic tape, DVD, ROM, etc. It is also to be appreciated that the series of instructions, code sequences, configuration information, or other data need not be stored locally, and could be stored on a propagated data signal received from a remote storage device, such as a server on a network, via a network/communication interface 1012. The instructions, code sequences, configuration information, or other data may be copied from the data storage 1210, such as mass storage, or from the propagated data signal into a memory 1204 and accessed and executed by processor 1202.

In alternate embodiments, the present invention is implemented in discrete hardware or firmware. For example, one or more application specific integrated circuits (ASICs) could be programmed with some or all of the above-described functions of the present invention.

Accordingly, a novel method and system is described for a method and apparatus for a port management system 200. From the foregoing description, those skilled in the art will recognize that many other variations of the present invention are possible. In particular, while the present invention has been described as being implemented in a network environment comprising one or more switches 100 connecting a LAN 102 and a network 104, some of the logic may be distributed in other components of a network or inter-network application. Thus, the present invention is not limited by the details described. Instead, the present invention can be practiced with modifications and alterations within the spirit and scope of the appended claims.

What is claimed is:

1. A machine-implemented method for automatically provisioning a switch in a network, the method comprising:
    storing a command on a storage medium in a switch having a port configuration, the command having variables including at least one of a common variable, an end user profile variable, a device profile variable, and a session variable, and, when executed on a processor on the switch, changing the port configuration of a port on the switch;
    associating a defined network event with the command, the defined network event associated with an end user connecting to the network and a device connecting to the network;
    further storing, on the storage medium in the switch, current values of variables referenced in the command, the current values determined either prior to or upon an occurrence of the defined network event associated with the command;
    detecting in the network the occurrence of the defined network event, the defined network event having been previously associated with the command stored on the storage medium in the switch;
    receiving in an input interface on the switch a message communicating the occurrence of the defined network event to the switch;
    determining the current value of referenced variables prior to the occurrence of the defined network event associated with the command;
    determining the current value of referenced variables upon the occurrence of the defined network event associated with the command;
    preparing the command for execution in accordance with the determined values of the referenced variables;

executing the prepared command in the processor on the switch in response to receiving the message communicating the occurrence of the defined network event, wherein executing the prepared command in the processor on the switch includes:

evaluating an expression present in the control structure in the command, the control structure to modify the command's execution based on the evaluated expression;

modifying the command execution to change the port configuration in accordance with the evaluated expression; and changing the port configuration of the port on the switch in accordance with the determined values of the referenced variables and the evaluated expression.

2. The method of claim 1, wherein determining the value of the referenced variable upon the occurrence of the defined network event associated with the command is based on parameter values contained in the message for communicating the defined network event to the switch.

3. The method of claim 2, wherein the parameter values contained in the message for communicating the defined network event to the switch conform to a protocol.

4. The method of claim 2, wherein the message for communicating the defined network event to the switch was sent from an authentication server connected to the network.

5. The method of claim 1, further comprising:
referencing a function in the command, wherein the function returns a value to modify the command's execution based on the returned value; and
modifying the command execution to change the port configuration in accordance with the returned value of the referenced function.

6. The method of claim 1, wherein the defined network event associated with the command is an event associated with the device connecting to the network.

7. The method of claim 6, wherein the defined network event associated with the device is one of a detection and un-detection of the device connecting to the network.

8. The method of claim 6, wherein the defined network event associated with the device is communicated to the switch using a Link Layer Data Protocol (LLDP).

9. The method of claim 1, wherein the defined network event associated with the command is an event associated with the end user connecting to the network.

10. The method of claim 9, wherein the defined network event associated with the end user connecting to the network is one of authenticating and un-authenticating the end user connecting to the network.

11. The method of claim 10, wherein the defined network event associated with the end user is communicated to the switch using a NetLogin authentication protocol.

12. The method of claim 11, wherein the NetLogin authentication protocol is one of a MAC-based protocol, a web-based protocol, and an IEEE 802.1X-based protocol.

13. The method of claim 1, further comprising:
associating the command with a port on the switch; and
executing the command in response to the occurrence of the defined network event to change the port configuration of the associated port.

14. The method of claim 1, further comprising:
executing the command in one of a persistent and non-persistent modes.

15. The method of claim 14, further comprising:
determining that the command is executing in persistent mode; and
saving the port configuration change to a persistent repository on the switch to preserve the port configuration change if the switch is re-booted.

16. The method of claim 1, further comprising:
receiving a request to execute the command from a command line interface; and
executing the command in response to the request.

17. A port management system to control access to a network resource, the system comprising:
a repository in which is stored a profile containing a set of commands, the execution of which controls access to a network resource via a port on a switch, wherein the profile containing the set of commands further includes a command that references a variable, the variable including at least one of a common variable, an end user profile variable, a device profile variable, and a session variable, the referenced variable having a value stored in the repository that is determined either prior to or upon an occurrence of a defined network event associated with the profile, and a control structure to conditionally modify the profile execution depending on the value of the referenced variable stored in the repository;
a definition of the defined network event, the occurrence of which triggers execution of the profile, the defined network event associated with an end user accessing the network and a device accessing the network;
a message communicating the occurrence of the defined network event to the switch;
a port manager having an interface to create the profile, define the defined network event, associate the profile with the defined network event and a port on the switch, and to receive the message communicating the occurrence of the defined network event to the switch; and
a processor in which to operate the port manager, and in which to determine the value of the referenced variable prior to or upon the occurrence of the defined network event and prepare the profile for execution in accordance with the determined value of the referenced variable, execute the prepared profile upon receipt of the message communicating the occurrence of the defined network event and, in accordance with the control structure, to conditionally modify the prepared profile execution depending on the determined value of the referenced variable, the execution of the prepared profile to control access to the network resource via the associated port on the switch.

18. The port management system of claim 17, wherein the profile containing the set of commands includes a command that references a function that returns a value, and wherein the processor executes the profile in accordance with the returned value.

19. The port management system of claim 17, wherein the defined network event is an event associated with the device accessing the network.

20. The port management system of claim 19, wherein the defined network event associated with the device is one of a detection and un-detection of the device accessing the network.

21. The port management system of claim 19, wherein the defined network event associated with the device is communicated to the switch using a Link Layer Data Protocol (LLDP).

22. The port management system of claim 17, wherein the defined network event is an event associated with the end user accessing the network.

23. The port management system of claim 22, wherein the defined network event associated with the end user is one of authenticating and un-authenticating the end user accessing the network.

24. The port management system of claim 22, wherein the defined network event associated with the end user is communicated to the switch using a NetLogin authentication protocol.

25. The port management system of claim 24, wherein the NetLogin authentication protocol is one of a MAC-based protocol, a web-based protocol, and an IEEE 802.1X-based protocol.

26. The port management system of claim 17, in which to execute the profile upon the occurrence of the defined network event to control access to the network resource via the associated port on the switch includes executing a command in the profile that causes a port configuration change.

27. The port management system of claim 17, in which to execute the profile upon the occurrence of the defined network event to control access to the network resource via the associated port on the switch includes executing a command in the profile that causes a policy change.

28. The port management system of claim 17, wherein the defined network event is a timer, the expiration of which triggers execution of the profile.

29. The port management system of claim 28, wherein the timer specifies a time at which the timer expires.

30. The port management system of claim 28, wherein the timer specifies an interval after which the timer expires.

31. The port management system of claim 17, wherein the network resource is a device accessible via the network.

32. The port management system of claim 17, wherein the network resource is a service accessible via the network.

33. The method of claim 1 where the current value of referenced variables determined prior to the occurrence of the defined network event associated with the command include:
values for common variables available for use in any command; and
values for session variables available for use in particular commands for variable management.

34. The method of claim 1, wherein the current value of referenced variables determined upon the occurrence of the defined network event associated with the command include:
values for user profile variables including a name of the user that was authenticated, the number of authenticated users on the affected switch port after the occurrence of the defined network event, the MAC or IP address of the user, and the port and VLAN associated with the defined network event; and
values for device profile variables including a device identification, including a MAC or IP address of a device, and a power, manufacturer and model name of a device.

35. The port management system of claim 17, wherein the value of the referenced variable determined prior to the occurrence of the defined network event associated with the command include:
values for common variables available for use in any command; and
values for session variables available for use in particular commands for variable management.

36. The port management system of claim 17, wherein the value of referenced variables determined upon the occurrence of the defined network event associated with the command include:
values for user profile variables including a name of the user that was authenticated, the number of authenticated users on the affected switch port after the occurrence of the defined network event, the MAC or IP address of the user, and the port and VLAN associated with the defined network event; and
values for device profile variables including a device identification, including a MAC or IP address of a device, and a power, manufacturer and model name of a device.

* * * * *

UNITED STATES PATENT AND TRADEMARK OFFICE
CERTIFICATE OF CORRECTION

| | | |
|---|---|---|
| PATENT NO. | : 8,751,649 B2 | Page 1 of 1 |
| APPLICATION NO. | : 11/731135 | |
| DATED | : June 10, 2014 | |
| INVENTOR(S) | : Villait et al. | |

It is certified that error appears in the above-identified patent and that said Letters Patent is hereby corrected as shown below:

On the title page, item [73] Delete "Extreme Networks" and insert --Extreme Networks, Inc.--.

Signed and Sealed this
Second Day of December, 2014

Michelle K. Lee
*Deputy Director of the United States Patent and Trademark Office*